US010805651B2

United States Patent
Budd et al.

(10) Patent No.: US 10,805,651 B2
(45) Date of Patent: Oct. 13, 2020

(54) ADAPTIVE SYNCHRONIZATION WITH LIVE MEDIA STREAM

(71) Applicant: International Business Machines Corporation, Armonk, NY (US)

(72) Inventors: Colin Budd, Austin, TX (US); Alexander Jacob Katz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 16/172,307

(22) Filed: Oct. 26, 2018

(65) Prior Publication Data

US 2020/0137433 A1    Apr. 30, 2020

(51) Int. Cl.
| | |
|---|---|
| *H04N 21/2387* | (2011.01) |
| *H04N 21/2187* | (2011.01) |
| *H04N 21/231* | (2011.01) |
| *H04N 21/242* | (2011.01) |
| *H04N 21/262* | (2011.01) |
| *H04N 21/238* | (2011.01) |

(Continued)

(52) U.S. Cl.
CPC ..... *H04N 21/2387* (2013.01); *H04N 21/2187* (2013.01); *H04N 21/23106* (2013.01); *H04N 21/23805* (2013.01); *H04N 21/242* (2013.01); *H04N 21/26283* (2013.01); *H04N 21/47217* (2013.01); *H04N 21/6587* (2013.01)

(58) Field of Classification Search
CPC ........... H04N 21/2387; H04N 21/2187; H04N 21/23106; H04N 21/23805; H04N 21/242; H04N 21/26283; H04N 21/47217; H04N 21/6587

See application file for complete search history.

(56) References Cited

U.S. PATENT DOCUMENTS

| | | | |
|---|---|---|---|
| 6,014,706 A | 1/2000 | Cannon et al. | |
| 6,259,441 B1 * | 7/2001 | Ahmad | H04N 5/775 386/225 |

(Continued)

OTHER PUBLICATIONS

"Laconia Shuffle", retrieved from "https://play.google.com/store/apps/details?id=com.niknamelogin.laconia.shuffle" on Oct. 22, 2018.

(Continued)

*Primary Examiner* — Randy A Flynn
(74) *Attorney, Agent, or Firm* — North Shore Patents, P.C.; Michele Liu Baillie

(57) ABSTRACT

In synchronizing a playback of recorded media with a live media stream, a server streams live media to each of a plurality of participant devices at a normal rate. The live media stream is recorded and stored as the recorded media stream. When the server receives, from a given participant device of the plurality of participant devices, a request for playback after a pause at or a rewind to a specified location in the live media stream, the server calculates a playback rate to play the recorded media stream starting at the specified location. The playback rate is calculated such that a playback of the recorded media stream synchronizes with the live media stream at a target location or at a target time. The recorded media stream is then caused to play at the given participant device at the playback rate starting at the specified location.

21 Claims, 4 Drawing Sheets

(51) Int. Cl.
*H04N 21/472* (2011.01)
*H04N 21/6587* (2011.01)

(56) References Cited

U.S. PATENT DOCUMENTS

| | | | |
|---|---|---|---|
| 7,739,715 B2 | 6/2010 | He et al. | |
| 8,121,277 B2 | 2/2012 | Baird | |
| 9,154,618 B2 | 10/2015 | Kaplan et al. | |
| 9,344,291 B2 | 5/2016 | Midtun et al. | |
| 9,665,237 B1 | 5/2017 | Hintermeister et al. | |
| 2003/0070182 A1* | 4/2003 | Pierre | H04N 21/4325 725/135 |
| 2003/0212997 A1* | 11/2003 | Hejna, Jr. | H04N 21/47217 725/88 |
| 2007/0183744 A1* | 8/2007 | Koizumi | H04N 21/41407 386/291 |
| 2007/0212023 A1* | 9/2007 | Whillock | H04N 21/4394 386/281 |
| 2010/0195974 A1 | 8/2010 | Zheng et al. | |
| 2011/0040981 A1* | 2/2011 | Lindahl | H04H 20/40 713/189 |
| 2014/0199053 A1* | 7/2014 | Sardera | H04N 21/2387 386/343 |
| 2016/0127765 A1* | 5/2016 | Robinson | H04N 21/4333 725/12 |
| 2016/0134945 A1* | 5/2016 | Gower | H04N 21/234345 725/88 |
| 2017/0332036 A1* | 11/2017 | Panchaksharaiah | H04N 21/44008 |
| 2018/0061453 A1* | 3/2018 | Srinivasan | G11B 27/19 |

OTHER PUBLICATIONS

"Laconia Trim", retrieved from "https://laconiatrimvideo.com/" on Oct. 22, 2018.
Audacity Manual, "Truncate Silence", retrieved from "http://ttmanual.audacityteam.org/man/Truncate_Silence"; Nov. 27, 2012.
Shinyama, Yusuke, "PDFMiner", retrieved from "http://www.unixuser.org/~euske/python/pdfminer/index.html"; Mar. 24, 2014.

* cited by examiner

ADAPTIVE SYNCHRONIZATION WITH LIVE MEDIA STREAM

BACKGROUND

Live media may be made available to participants remotely, where multiple participants view a streamed media from their respective client devices over a computing network. During the live media stream, one or more participants may wish to watch or listen to a portion of the media stream again. However, the ability to rewind the live media stream is often not possible. Even when possible, the playback of the media stream after the rewind proceeds at the normal rate, which results in the playback being out of synchronization with the live media stream.

SUMMARY

Disclosed herein is a method for adaptive synchronization with a live media stream, and a computer program product and system as specified in the independent claims. Embodiments of the present invention are given in the dependent claims. Embodiments of the present invention can be freely combined with each other if they are not mutually exclusive.

According to an embodiment of the present invention, in synchronizing a playback of recorded media with a live media stream, a server streams live media to each of a plurality of participant devices at a normal rate. The live media stream is recorded and stored as the recorded media stream. When the server receives, from a given participant device of the plurality of participant devices, a request for playback after a pause at or a rewind to a specified location in the live media stream, the server calculates a playback rate to play the recorded media stream starting at the specified location. The playback rate is calculated such that a playback of the recorded media stream synchronizes with the live media stream at a target location or at a target time. The recorded media stream is then caused to play at the given participant device at the playback rate starting at the specified location.

DETAILED DESCRIPTION

Embodiments of the present invention allow the pausing or rewinding of a live media stream and the playback of a recording of the media stream at a playback rate that achieves synchronization with the live media stream at a given time.

Figure 1:
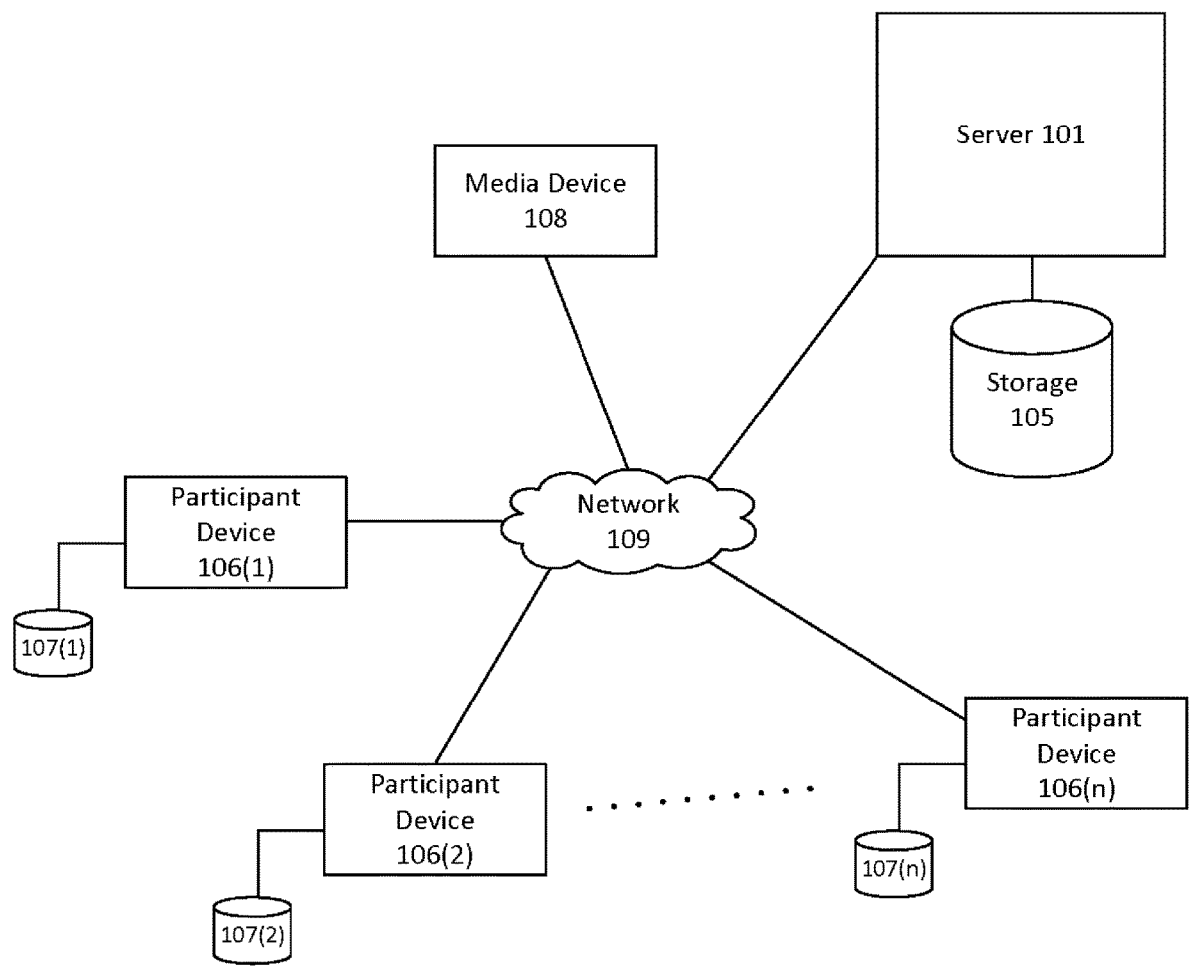
FIG. 1 illustrates an example network for the adaptive synchronization with a live media stream according to some embodiments.

FIG. 1 illustrates an example network for the adaptive synchronization with a live media stream according to some embodiments. The network 109 includes a server 101, a plurality of participant devices 106(1)-106(n), and a media device 108 for providing media which is lived streamed to the participant devices 106(1)-106(n) by the server 101. The participant devices 106(1)-106(n) each includes a local storage 107(1)-107(n). The server 101 includes mechanisms for facilitating and managing the live media stream from the media device 108 to the participant devices 106(1)-106(n), recording the live media stream and the recorded, media stream, which may be stored at a network storage 105, and facilitating and managing the pausing, rewinding, and and/or playback of the recorded media stream. The functionalities of the components of the network 109 are described further below.

Figure 2:
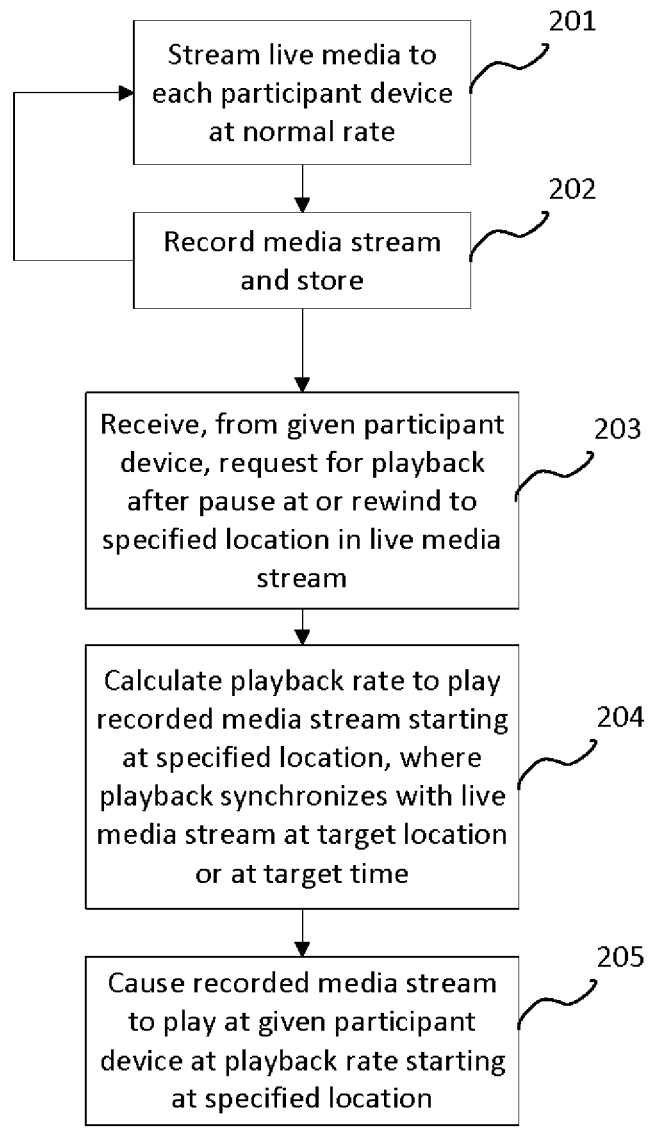
FIG. 2 illustrates a method for adaptive synchronization with a live media stream according to some embodiments.

FIG. 2 illustrates a method for adaptive synchronization with a live media stream according, to some embodiments. The server 101 streams live media from the media device 108 to each of the participant devices 106(1)-106(n) at a normal rate (201). The server 101 records the live media stream and stores the recorded media stream at the storage 105 (202). Alternatively, each participant device 106(1)-106(n) independently records the live media stream and stores a copy of recorded media stream at their respective local storages 107(1)-107(n). During the live media stream, the server 101 receives, from a given participant device (e.g. participant device 106(1)), a request for playback after a pause at or a rewind to a specified location in the live media stream (203). In response, the server 101 calculates a playback rate to play the recorded media stream starting at the specified location, where the playback synchronizes with the live media stream at a target location in the recorded media stream or at a target time (204). The target location and/or the target time may be preconfigured or specified at the time of the request. The recorded media stream is caused to be played, at the given participant device 106(1) at the playback rate starting at the specified location (205).

For example, assume that the live media stream is to be a live presentation of a document with multiple presentation slides. Each presentation slide contains text, images, or a combination of text and images. The presentation document is provided to the server 101 prior to the commencement of the live presentation, and the server 101 parses the presentation document to identify the text slides, image slides, and, combination slides. The live presentation includes audio from the presenter at the media device 108 and a visual of the presentation slides. Referring to FIG. 2, assume that the presenter begins the presentation via the media device 108, and the server 101 streams the live presentation to each participant device 106(1)-106(n) at a normal rate (201). The live presentation is recorded and stored (202). During the live presentation, participant device 106(1) sends to the server 101 a request for playback after a rewind of the presentation to a specified location (203). In response, the server 101 calculates a playback rate (204). In this example, assume the following variables:

Ta=average time spent by presenter on a slide type=text
Ia=average time spent by presenter on a slide type=image
Ca=average time spent by presenter on a slide type=combination
Tr=number of text slides remaining in presentation document
Ir=number of image slides remaining in the presentation document
Cr=number of combination slides remaining in the presentation document
d=rewind time In this example, the specified location in the presentation for the rewind is converted to a time duration. For example, the participant rewinds to back up two slides, which was presented five minutes ago. The specified location is thus converted to d=5 minutes. Also assume that the target location is the end of the presentation document. The target time is thus the estimated time at which the presenter will conclude the live presentation, or the "estimated remaining time of the presentation" (ERTP). In calculating the playback rate, the server 101 calculates the ERTP as a sum of the product of the average time spent per slide type and the remaining number of corresponding slides:

ERTP=($Ta*Tr$)+($Ia*Ir$)+($Ca*Cr$)

Historical data, if any, concerning time spent on each slide type may be used to calculate Ta, Ia, and/or Ca. The server 101 further calculates an estimated remaining time in the recorded stream (ERTRS) as:

ERTRS=$d$+ERTP

A playback rate, factor is calculated as:

Playback rate factor=ERTRS/ERTP.

The playback rate is thus calculated as:

Playback rate=(ERTRS/ERTP)*normal rate

At the participant device 106(1), the recorded media stream is played at this playback rate starting two slides back or 5 minutes prior (205). In this manner, the recorded media stream is played back at a rate such that the playback of the recorded presentation ends at the same time as the live presentation.

In some embodiments, the calculation of the playback rate is updated as the live presentation progresses. The recalculation of the playback rate can be configured to occur periodically, such as after each slide is presented in the live presentation, or at predetermined intervals, or at specified times or locations in the presentation. During the live presentation, the server 101 monitors the actual time spent on each slide type by the presenter. At each iteration, Ta, Ia, and Ca are updated based on the actual time spent. An updated playback rate is then calculated and applied to the playback of the remaining (unplayed) portions of the recorded media stream.

In the event that the participant device 106(1) requests a playback after another pause or rewind of the recorded media stream playback to another specified location in the recorded media stream, the playback rate is recalculated. In the example above, the ERTRS is updated by adding the additional rewind or pause time. The playback of the recorded media stream is then played at the recalculated playback rate starting at the other specified location.

In some embodiments, the server 101 further analyzes the live media stream for non-essential additions, such as filler words or sounds, pauses in speech, or periods of silence. The non-essential additions are removed from the recorded media stream, resulting in a truncated recorded media stream. The playback rate is then calculated for the playback of the truncated recorded media stream, in the manner described above. This allows for the faster consumption of the truncated recorded media stream and more efficient synchronization with the live media stream.

In one exemplary embodiment, to detect moments of silence as non-essential, the server 101 first, registers silence within the audio feed that lasts longer than a predetermine length and cross-references this segment with the corresponding video feed. For example, moments of silence coupled with inaction of a certain threshold length are considered non-essential and flagged for removal. The inaction may include minimal presenter, movements, simple slide animations, and otherwise insignificant delta change of pixels on a screen. Once the non-essential additions are identified, the server 101 splices the audio and video feeds by selecting the exact duration required for removal without interference with the content, removing the non-essential segments of audio and video, and truncating the audio and video files.

Although the example above is described with the end of the presentation document as the target location and the estimated time, at which the presenter will conclude the live presentation as the target time, other target locations and/or target times may be used. For example, the target location may be configured to be before the end of the live presentation. Once the playback of the recorded presentation reaches the target location, the participant device 106(1) is switched back to the live presentation stream. For another example, the target time may be configured to be "as soon as possible", optionally with a configured maximum playback rate. Once the playback of the recorded presentation reaches the same slide as the live presentation, the participant device 106(1) is switched back to the live presentation stream.

Although the embodiments are described above with a live media stream, the adaptive synchronization according to the present invention may be applied to the pausing or rewinding of a pre-recorded media stream as well, where the estimated remaining time of the media stream or presentation is a known value in the calculation of the playback rate.

Figure 3:
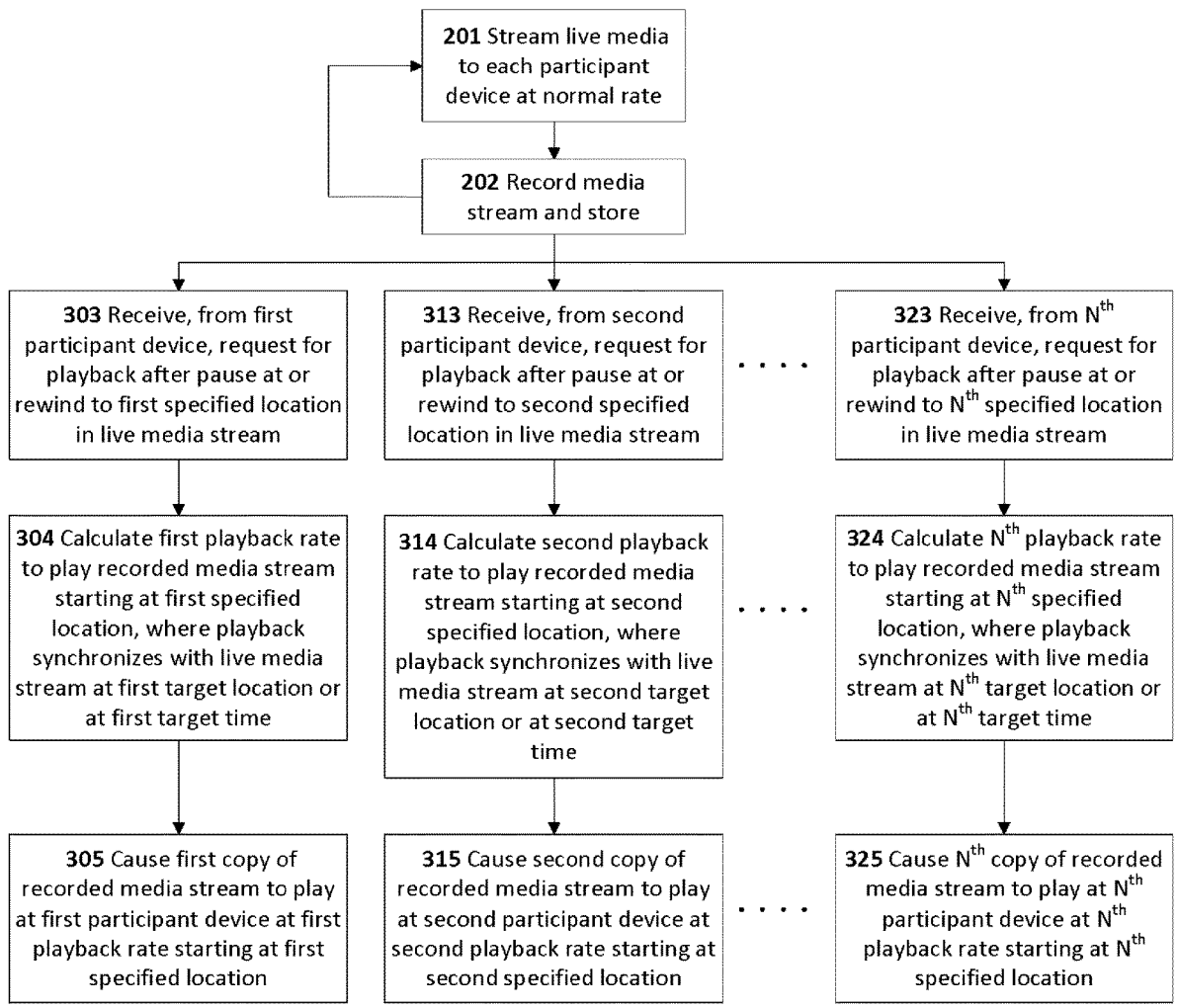
FIG. 3 illustrates a method for adaptive synchronization with a live media stream for multiple participant devices according to some embodiments.

In some embodiments, the adaptive synchronization occurs independently at each participant device 106(1)-106(n). FIG. 3 illustrates a method for adaptive synchronization with a live media stream for multiple participant devices according to some embodiments. Blocks 201-202 are described above with reference to FIG. 2. In FIG. 3, during the live media stream, the server 101 receives, from a first participant device 106(1), a request for playback after a pause at or a rewind to a first specified location in the live media stream (303). The server 101 calculates a first playback rate to play the recorded media stream starting at the first specified location, where the playback synchronizes with the live media stream at a first target location or at a first target time (304). A first copy of the recorded media stream is caused to be played at the first participant device 106(1) at the first playback rate starting at the first specified location (305). The server 101 also receives, from a second participant device 106(2), a request for playback after a pause at or a rewind to a second specified location in the live media stream (313). The server 101 calculates a second playback rate to play the recorded media stream starting at the second specified location, where the playback synchronizes with the live media stream at a second target location or at the second target time (314). A second copy of the recorded media stream is caused to be played at the second participant device 106(2) at the second playback rate starting at the second specified location (315). Blocks 303-305 and blocks 313-315 are performed independently of each other. Different copies of the recorded media stream are played back using different playback rates for different specified locations, target locations, and/or target times. When an additional participant device 106(n) sends a request for playback after a pause or a rewind of the media stream, blocks 324 and 325 are similarly independently performed. The adaptive synchronization of the live media stream is thus customized for each participant device. Multiple pauses or rewinds of the media stream are also independent managed for each participant device, as described above.

In some embodiments, blocks 202, 303-305, 313-315, and 323-325 are performed by the server 101. The server 101 records the live media stream and stores the recorded media stream at a storage 105 coupled to the server 101. When multiple participant devices 106(1)-106(n) send requests to pause or rewind the media stream, the server 101 calculates the playback rates for each participant device and streams a separate copy of the recorded media stream to each participant device for playback at their respective playback rates.

In some embodiments, each participant device 106(1)-106(n) records their own copy of the live media stream and stores their respective copies of the recorded media stream at their respective local storages 107(1)-107(n). The server 101 calculates the playback rate for each participant device and sends each respective playback rate to the corresponding participant device. Each participant device 106(1)-106(n) then plays back the recorded media stream from their respective local storage 107(1)-107(n). Alternatively, the server 101 monitors the live media stream and sends to each participant device 106(1)-106(n) the variable values required, to calculate the playback rate, such as Ta, Ia, Ca, Tr, Ir. and Cr in the example above, and each participant device 106(1)-106(n) calculates their respective playback rates and manages the playback of their own respective copies of the recorded media stream.

Figure 4:
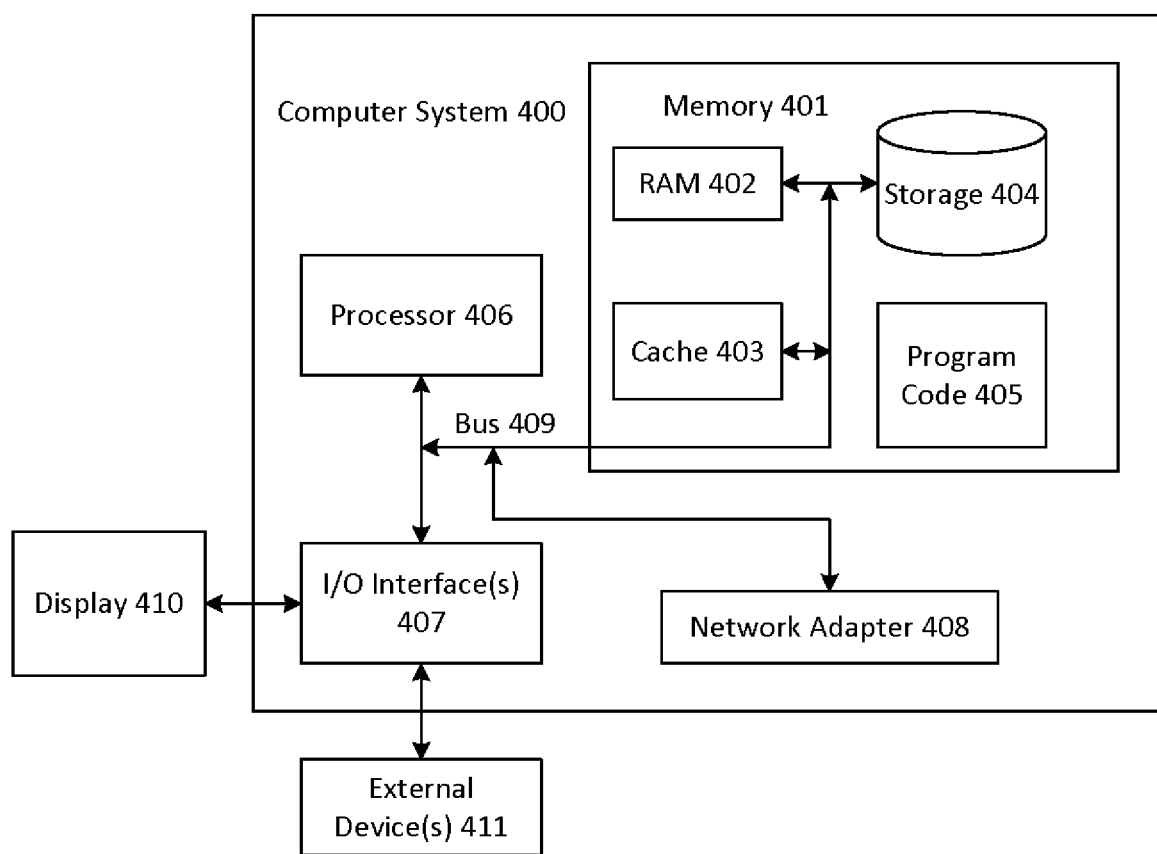
FIG. 4 illustrates a computer system, one or more of which implements the adaptive synchronization according to embodiments of the present invention.

FIG. 4 illustrates a computer system, one or more of which implements the adaptive synchronization according to embodiments of the present invention. The computer system 400 is operationally coupled to a processor or processing units 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM) 402 or cache memory 403, or non-volatile storage media 404. The memory 401 may include at least one program product having a set of at least one program code module 405 that are configured to carry out the functions of embodiment of the present invention when executed by the processor 406. The computer system 400 may also communicate with one or more external devices 411, such as a display 410, via I/O interfaces 407. The computer system 400 may communicate with one or more networks via network adapter 408.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any, suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area, network, a wide, area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Small C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on, the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for synchronizing a playback of recorded media with a live media stream, comprising:
    streaming, by a server, live media to each of a plurality of participant devices at a normal rate, the live media stream comprising a live presentation of a document with a plurality of presentation slides by a presenter, the plurality of presentation slides comprising at least one slide of a first type and at least one slide of a second type;
    recording the live media stream and storing the recorded media stream;
    receiving, by the server from a given participant device of the plurality of participant devices, a request for playback after a pause at or a rewind to a specified slide of the plurality of presentation slides in the live media stream;
    in response, calculating a playback rate to play the recorded media stream starting at the specified slide, wherein a playback of the recorded media stream synchronizes with the live media stream at a target slide of the plurality of presentation slides, wherein the calculating comprises:
        determining a first average time spent on the at least one slide of the first type and a second average time spent on the at least one slide of the second type by the presenter during the live presentation;
        determining a first number of slides of the first type and a second number of slides of the second type remaining in the plurality of presentation slides for a remainder of the live presentation; and
        calculating the playback rate based on the first average time, the second average time, the first number of slides, the second number of slides, the specified slide, the target slide, and the normal rate; and
    causing the recorded media stream to play at the given participant device at the playback rate starting at the specified slide.

2. The method of claim 1, wherein the calculating of the playback rate comprises:
    calculating an estimated remaining time of the live presentation to reach the target slide (X) based on a sum of a first product of the first average time with the first number of slides and a second product of the second average time with the second number of slides;
    calculating an estimated remaining time of the recorded media stream to reach the target slide (Y) based on X and the target slide;
    calculating a playback rate factor as X/Y; and
    calculating the playback rate as a product of the playback rate factor and the normal rate.

3. The method of claim 1, further comprising:
    during the playing of the recorded media stream, receiving a second request for playback after a second pause at or a second rewind to a second specified slide in the recorded media stream;
    in response, recalculating the playback rate for the recorded media stream, wherein the playback of the recorded media stream starting at the second specified slide is synchronized with the live media stream at the target slide of the plurality of presentation slides; and
    causing the recorded media stream to play at the given participant device at the recalculated playback rate starting at the second specified slide.

4. The method of claim 1, wherein the calculating of the playback rate and the playing of the recoded media stream comprise:
    removing non-essential segments from the recorded media stream to form a truncated recorded media stream;
    calculating the playback rate to play the truncated recorded media stream, where the playback of the truncated recorded media stream synchronizes with the live media stream at the target slide of the plurality of presentation slides; and
    causing the truncated recorded media stream to play at the given participant device at the playback rate starting at the specified location.

5. The method of claim 1, further comprising:
    receiving, by the server from a second participant device of the plurality of participant devices, a second request for playback after a pause at or a rewind to a second specified slide of the plurality of presentation slides in the live media stream;

in response, calculating a second playback rate to play a second copy of the recorded media stream starting at the second specified slide, wherein a playback of the second copy of the recorded media stream synchronizes with the live media stream at a second target slide of the plurality of presentation slides; and causing the second copy of the recorded media stream to play at the second participant device at the second playback rate starting at the second specified slide, wherein the calculating of the second playback rate and the playing of the second copy of the recorded media stream are performed independently of the calculating of the playback rate and the playing of the recorded media stream in response to the request from the given participant device.

6. The method of claim 1, wherein two or more participant devices of the plurality of participant devices each records a copy of the live media stream, stores a corresponding recorded media stream at a corresponding local storage, and plays the corresponding recorded media stream at a corresponding playback rate.

7. The method of claim 1, wherein the document is received by the server prior to the streaming of the live media.

8. The method of claim 1, wherein the plurality of presentation slides comprises at least one slide of a combination type, the combination type comprising a combination of the first type and the second type, wherein the calculating of the playback rate further comprises:
determining a third average time spent by the presenter on the at least one slide of the combination type during the live presentation;
determining a third number of slides of the combination type remaining in the plurality of presentation slides for the remainder of the live presentation; and
calculating the playback rate based on the first average time, the second average time, the third average time, the first number of slides, the second number of slides, the third number of slides, the specified slide, the target slide, and the normal rate.

9. The method of claim 1, wherein the first type comprises a text type and the second type comprises an image type.

10. The method of claim 1, further comprising:
during the live presentation, monitoring a first actual time spent on each slide of the first type and a second actual time spent on each slide of the second type in the document;
updating the first average time and the second average time based on the first actual time and the second actual time;
determining an updated first number of slides of the first type and an updated second number of slides of the second type remaining in the plurality of presentation slides for an updated remainder of the live presentation;
after causing the recorded media stream to play at the given participant device, updating the playback rate based on the updated first average time, the updated second average time, the updated first number of slides, and the updated second number of slides for the updated remainder of the live presentation; and
causing a remainder of the recorded media stream to play at the given participant device at the updated playback rate.

11. A computer program product for synchronizing a playback of recorded media with a live media stream, the computer program product comprising a computer readable storage medium having program instructions embodied therewith, the program instructions executable by a processor to cause the processor to:
stream live media to each of a plurality of participant devices at a normal rate, the live media stream comprising a live presentation of a document with a plurality of presentation slides by a presenter, the plurality of presentation slides comprising at least one slide of a first type and at least one slide of a second type;
record the live media stream and storing the recorded media stream;
receive from a given participant device of the plurality of participant devices a request for playback after a pause at or a rewind to a specified slide of the plurality of presentation slides in the live media stream;
in response, calculate a playback rate to play the recorded media stream starting at the specified slide, wherein a playback of the recorded media stream synchronizes with the live media stream at a target slide of the plurality of presentation slides, wherein the calculate comprises:
determine a first average time spent on the at least one slide of the first type and a second average time spent on the at least one slide of the second type by the presenter during the live presentation;
determine a first number of slides of the first type and a second number of slides of the second type remaining in the plurality of presentation slides for a remainder of the live presentation; and
calculate the playback rate based on the first average time, the second average time, the first number of slides, the second number of slides, the specified slide, the target slide, and the normal rate; and
cause the recorded media stream to play at the given participant device at the playback rate starting at the specified slide.

12. The computer program product of claim 11, wherein in the calculating of the playback rate, the processor is further caused to:
calculate an estimated remaining time of the live presentation to reach the target slide (X) based on a sum of a first product of the first average time with the first number of slides and a second product of the second average time with the second number of slides;
calculate an estimated remaining time of the recorded media stream to reach the target slide (Y) based on X and the target slide;
calculate a playback rate factor as X/Y; and
calculate the playback rate as a product of the playback rate factor and the normal rate.

13. The computer program product of claim 11, wherein the processor is further caused to:
during the playing of the recorded media stream, receive a second request for playback after a second pause at or a second rewind to a second specified slide in the recorded media stream;
in response, recalculate the playback rate for the recorded media stream, wherein the playback of the recorded media stream starting at the second specified slide is synchronized with the live media stream at the target slide of the plurality of presentation slides; and
cause the recorded media stream to play at the given participant device at the recalculated playback rate starting at the second specified slide.

14. The computer program product of claim 11, wherein the calculating of the playback rate and the playing of the recoded media stream comprise:

remove non-essential segments from the recorded media stream to form a truncated recorded media stream;
calculate the playback rate to play the truncated recorded media stream, where the playback of the truncated recorded media stream synchronizes with the live media stream at the target slide of the plurality of presentation slides; and
cause the truncated recorded media stream to play at the given participant device at the playback rate starting at the specified location.

15. The computer program product of claim 11, wherein the processor is further cause to:
receive, from a second participant device of the plurality of participant devices, a second request for playback after a pause at or a rewind to a second specified slide of the plurality of presentation slides in the live media stream;
in response, calculate a second playback rate to play a second copy of the recorded media stream starting at the second specified slide, wherein a playback of the second copy of the recorded media stream synchronizes with the live media stream at a second target slide of the plurality of presentation slides; and
cause the second copy of the recorded media stream to play at the second participant device at the second playback rate starting at the second specified slide,
wherein the calculating of the second playback rate and the playing of the second copy of the recorded media stream are performed independently of the calculating of the playback rate and the playing of the recorded media stream in response to the request from the given participant device.

16. The computer program product of claim 11, wherein two or more participant devices of the plurality of participant devices each records a copy of the live media stream, stores a corresponding recorded media stream at a corresponding local storage, and plays the corresponding recorded media stream at a corresponding playback rate.

17. A system, comprising:
a processor; and
a computer readable storage medium having program instructions embodied therewith, the program instructions executable by a processor to cause the processor to:
stream live media to each of a plurality of participant devices at a normal rate, the live media stream comprising a live presentation of a document with a plurality of presentation slides by a presenter, the plurality of presentation slides comprising at least one slide of a first type and at least one slide of a second type;
record the live media stream and storing the recorded media stream;
receive from a given participant device of the plurality of participant devices a request for playback after a pause at or a rewind to a specified slide of the plurality of presentation slides in the live media stream;
in response, calculate a playback rate to play the recorded media stream starting at the specified slide, wherein a playback of the recorded media stream synchronizes with the live media stream at a target slide of the plurality of presentation slides, wherein the calculate comprises:
determine a first average time spent on the at least one slide of the first type and a second average time spent on the at least one slide of the second type by the presenter during the live presentation;
determine a first number of slides of the first type and a second number of slides of the second type remaining in the plurality of presentation slides for a remainder of the live presentation; and
calculate the playback rate based on the first average time, the second average time, the first number of slides, the second number of slides, the specified slide, the target slide, and the normal rate; and
cause the recorded media stream to play at the given participant device at the playback rate starting at the specified slide.

18. The system of claim 17, wherein in the calculating of the playback rate, the processor is further caused to:
calculate an estimated remaining time of the live presentation to reach the target slide (X) based on a sum of a first product of the first average time with the first number of slides and a second product of the second average time with the second number of slides;
calculate an estimated remaining time of the recorded media stream to reach the target slide (Y) based on X and the target slide;
calculate a playback rate factor as X/Y; and
calculate the playback rate as a product of the playback rate factor and the normal rate.

19. The system of claim 17, wherein the processor is further caused to:
during the playing of the recorded media stream, receive a second request for playback after a second pause at or a second rewind to a second specified slide in the recorded media stream;
in response, recalculate the playback rate for the recorded media stream, wherein the playback of the recorded media stream starting at the second specified slide is synchronized with the live media stream at the target slide of the plurality of presentation slides; and
cause the recorded media stream to play at the given participant device at the recalculated playback rate starting at the second specified slide.

20. The system of claim 17, wherein the calculating of the playback rate and the playing of the recoded media stream comprise:
remove non-essential segments from the recorded media stream to form a truncated recorded media stream;
calculate the playback rate to play the truncated recorded media stream, where the playback of the truncated recorded media stream synchronizes with the live media stream at the target slide of the plurality of presentation slides; and
cause the truncated recorded media stream to play at the given participant device at the playback rate starting at the specified location.

21. The system of claim 17, wherein the processor is further cause to:
receive, from a second participant device of the plurality of participant devices, a second request for playback after a pause at or a rewind to a second specified slide of the plurality of presentation slides in the live media stream;
in response, calculate a second playback rate to play a second copy of the recorded media stream starting at the second specified slide, wherein a playback of the second copy of the recorded media stream synchronizes with the live media stream at a second target slide of the plurality of presentation slides; and
cause the second copy of the recorded media stream to play at the second participant device at the second playback rate starting at the second specified slide, wherein the calculating of the second playback rate and the playing of the second copy of the recorded media stream are performed independently of the calculating of the playback rate and the playing of the recorded media stream in response to the request from the given participant device.

* * * * *